US008442442B2

(12) United States Patent
Monogioudis et al.

(10) Patent No.: US 8,442,442 B2
(45) Date of Patent: May 14, 2013

(54) METHODS FOR ASSIGNING SCRAMBLING CODES AND REDUCING INTERFERENCE IN TELECOMMUNICATIONS NETWORKS

(75) Inventors: Pantelis Monogioudis, Randolph, NJ (US); Subramanian Vasudevan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 743 days.

(21) Appl. No.: 12/588,827

(22) Filed: Oct. 29, 2009

(65) Prior Publication Data

US 2011/0105033 A1    May 5, 2011

(51) Int. Cl.
*H04B 1/00* (2006.01)
(52) U.S. Cl.
USPC ....... 455/63.1; 455/67.11; 370/203; 370/335; 370/342
(58) Field of Classification Search ........... 455/63.1, 455/67.11; 370/203, 335, 342
See application file for complete search history.

(56) References Cited

U.S. PATENT DOCUMENTS

| 7,613,231 | B2* | 11/2009 | Cho | 375/148 |
| 2004/0120289 | A1* | 6/2004 | Hamalainen et al. | 370/335 |
| 2006/0045171 | A1* | 3/2006 | Ryu et al. | 375/148 |
| 2007/0019536 | A1* | 1/2007 | Hamalainen et al. | 370/203 |

FOREIGN PATENT DOCUMENTS

| WO | WO 02/091779 | 11/2002 |
| WO | WO 03/007647 | 1/2003 |

OTHER PUBLICATIONS

International Search Report dated Mar. 3, 2011, issued in International Application No. PCT/US2010/053107.
Written Opinion dated Mar. 3, 2011, issued in International Application No. PCT/US2010/053107.

* cited by examiner

*Primary Examiner* — April G Gonzales
(74) *Attorney, Agent, or Firm* — Harness, Dickey & Pierce, P.L.C.

(57) ABSTRACT

Example methods use secondary scrambling codes in telecommunications networks. The secondary scrambling codes are assigned to mobile stations and channels used by mobile stations that are not adversely affected by the use of secondary scrambling codes. By assigning secondary scrambling codes additional users can utilize telecommunications networks with unique scrambling codes without reducing quality of service or increasing resource consumption. Example methods also reduce interference between mobile stations in the telecommunications networks.

13 Claims, 5 Drawing Sheets

METHODS FOR ASSIGNING SCRAMBLING CODES AND REDUCING INTERFERENCE IN TELECOMMUNICATIONS NETWORKS

BACKGROUND

1. Field

Example embodiments generally relate to telecommunications networks, methods of assigning scrambling codes therein, methods of utilizing scrambling codes therein, and methods of reducing interference within telecommunications networks.

2. Description of Related Art

FIG. 1 illustrates a portion of a conventional wireless telecommunications system. As shown, the telecommunications system includes a base station 10 and a plurality of mobile stations 15A-15C. As discussed herein, one or more of mobile stations 15A-15C may be referred to herein as mobile station(s) 15. In FIG. 1, each mobile station 15A, 15B, and 15C is associated with a respective code tree A, B and C.

Various types of signals are transmitted between base station 10 and individual mobile stations 15 associated therewith, including both user content/traffic and control-type overhead signals used for communicating.

At the base station 10, signals transmitted on the downlink (e.g., from base station 10 to mobile station 15) are spread and scrambled with a code known to both the base station 10 and the mobile station 15. Different spreading and scrambling codes may be used with different mobile stations and different types of signals to enable the mobile stations 15 to differentiate among types and ownership of received signals.

As mentioned above, reference to mobile station 15 refers to one or more of mobile stations 15A, 15B and 15C. Similarly, reference to signals 20 refers to one or more of signals 20A, 20B and 20C. Similar references to other components/signals throughout this discussion should be interpreted similarly.

Still referring to FIG. 1, at the base station 10, in of each code trees A, B and C an encoder/multiplier 11 encodes/spreads the user content/traffic signals 20 with a first spreading code W1. User content/traffic signals 20 include, for example, voice data, short messaging service (SMS) messages, streaming video, etc. Another encoder/multiplier 11 encodes/spreads the overhead signals 21 with a second spreading code W2. Overhead signals 21 include, for example, pilot signals, pages, synchronization messages, etc. Other overhead signals 22 are encoded with a third spreading code W3 by another encoder/multiplier 11.

Each of Code Trees A, B, and C is associated with a unique set of signals 20-22 that are simultaneously or otherwise transmitted to mobile stations 15. Signals from different code tree sets may be generated for, and ultimately transmitted to, a single mobile station. For example, a single mobile station 15A may be associated with distinct signals 20A, 20B, and 20C from three different code trees. Although only 3 different signals 20, 21, and 22 and 3 different mobile stations 15A, 15B, and 15C are shown in FIG. 1, many more signal types and mobile stations may be present in conventional wireless networks.

Still referring to FIG. 1, on each of code trees A, B and C, respective groups of encoded signals 20, 21 or 22 are superimposed or summed by code-tree specific summing device 12. The resultant summed signals for a particular code tree are then scrambled with additional code-tree specific scrambling codes $PN_A$, $PN_B$, $PN_C$ at a respective scrambler/multiplier 13 before being transmitted to mobile stations 15.

With respect to code tree A, for example, code-tree specific summing device 12 sums traffic signals 20A and overhead signals 21A and 22A. Scrambler/multiplier 13 then scrambles the resultant signal with scrambling code $PN_A$.

As shown in FIG. 1, once all coding is complete, a scalar multiplier 19 adjusts the average power for each signal set. In one example, the multiplier 19 adjusts the average power for a particular user and/or signal semi-statically (e.g., every several seconds) to match the load of the code resource to an optimized composite signal power. A base-station specific summer 14 superimposes or sums all signals from base station 10 and transmits the signals to mobile stations 15 on one or more frequencies associated with base station 10.

Spreading codes $W_1$, $W_2$, and $W_3$, code tree-specific scrambling codes $PN_A$, $PN_B$, $PN_C$, and/or identifiers thereof are transmitted to individual mobile stations 15 on an overhead channel designated for code reception. As a result, the mobile stations 15 possess the individual codes to decode received signals. Further, individual spreading and scrambling codes may be set by standards governing the operation of wireless networks such that mobile stations 15 know what spreading and scrambling codes correlate to what type of signal and to which user. Because the spreading and scrambling codes are known to the mobile station 15 and because the spreading and scrambling codes are distinct for each type of signal and code tree the mobile stations 15 are able to identify the type and ownership of the signals 20, 21, and 22. In addition, the mobile stations 15 are able to properly decode and utilize the information carried by the signals.

Similarly, mobile stations 15 ignore signals encoded with other or unknown spreading or scrambling codes. In this way, several different types of data may be transmitted and received on the downlink from several base stations to mobile stations.

One known type of spreading code is a Walsh code. Walsh codes are binary codes several-digits in length. Each Walsh code may be entirely or substantially uncorrelated, or orthogonal, to each other Walsh code used by a particular base station 10 such that different signals encoded with different Walsh codes are readily distinguishable. The following example sequences illustrate a code set of length 4 Walsh codes, all of which are orthogonal to each other:

$$W_1=\{1,-1,1,-1\}; W_2=\{1,1,1,1\}; W_3=\{1,1,-1,-1\}; W_4=\{-1,1,1,-1\}$$

An example of a known type of scrambling code is a Pseudo-Random Noise (PN) code. PN codes are binary or complex. And, signals encoded with PN codes are perceived as random background noise by mobile devices using different PN codes. Each PN code may be entirely or substantially uncorrelated, or orthogonal to each other PN code used by a particular base station 10.

In conventional networks with thousands of individual users, lengthy PN codes (e.g., having lengths of $2^{15}$) are used to provide a unique set of codes for each type of transmission to each user. Some codes are similar or used in a similar order for specific types of overhead signals among mobile stations 15 and base stations 10. But, each mobile station 15 and base station 10 uses an offset that uniquely phase-shifts each code resource set, which includes the spreading and scrambling codes for all signals directed to a particular code tree. The unique phase shift reduces the possibility of a transmission from one base station 10 being misinterpreted as a multi-path transmission from another base station.

Further, users in a "soft handoff" zone (e.g., moving between geographical locations serviced by multiple base stations 10) may receive data simultaneously or concurrently from multiple base stations. This requires allocation of a unique PN code set from each one of those base stations for a single user. Thus, it is possible for a single user to be assigned multiple code resource sets, or subsets thereof.

SUMMARY

A method according to an example embodiment reduces interference caused by secondary scrambling codes in a multi-antenna telecommunications network using primary and secondary scrambling codes. According to at least one example embodiment, a base station selects a candidate set among the plurality of candidate sets based on a correlation between code weights associated with each candidate set. Each candidate set includes at least two of the plurality of candidate mobile stations. A first of the at least two candidate mobile stations is assigned a first scrambling code and a second of the at least two mobile stations is assigned a second scrambling code. The base station then allocates wireless communication resources to the candidate mobile stations in the selected candidate set.

Example embodiments also provide methods and apparatuses for assigning primary and secondary scrambling codes to mobile stations in single- and multi-antenna wireless telecommunications network.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially and concurrently or may sometimes be executed in the reverse order, depending upon the functionality/acts involved.

Figure 1:
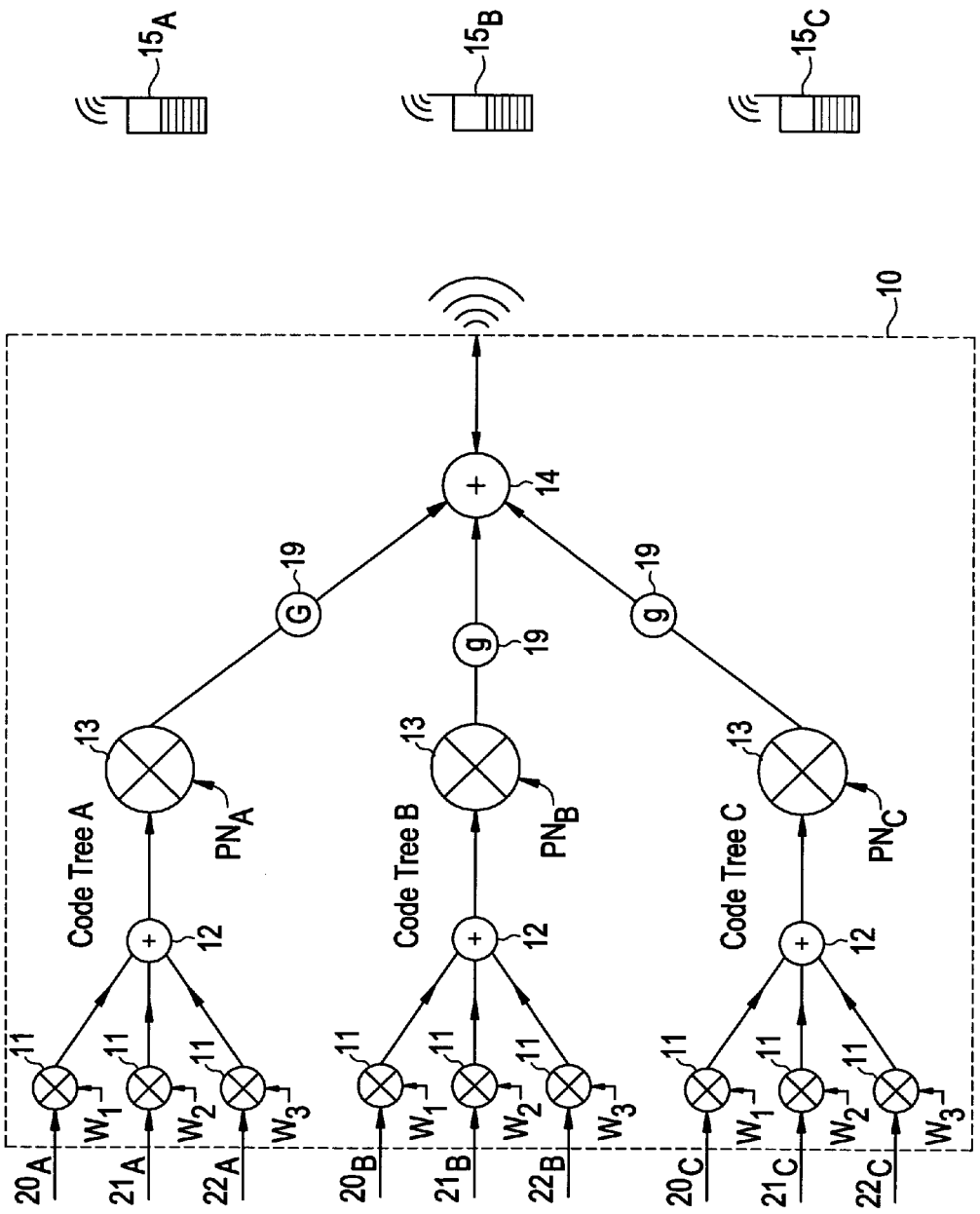
FIG. 1 is an illustration of a portion of a conventional single antenna wireless telecommunications network.

Conventional wireless telecommunications networks, such as the network shown in FIG. 1, use only a finite number of orthogonal scrambling codes, which limits the number of unique users that can be supported on the downlink of such a system. Additionally, because some users require allocation of a unique code set across each different base station sector during soft hand-off, the need for unique, orthogonal codes for each signal type, user, and base station further reduces the number of independent users that can be supported per sector.

Further, expanding the set of available Walsh codes by employing codes of greater length may require more code transmission between base station and mobile station, and thus, worsen overall link performance and/or consume additional network resources. Similarly, increasing a number of available scrambling codes by relaxing the orthogonality requirement between codes may result in unacceptably high cross-correlations for the entire set of mobile radio channels encountered in practice. For example, individual mobile stations may not be able to acceptably distinguish among non-orthogonally-encoded signals on the downlink. Further, if orthogonality requirements are relaxed, all users may experience a lower signal-to-noise ratio in the reception of signals in overhead channels because signals from other channels or between overhead channels may not be orthogonal. Overhead channels may be particularly affected by lower signal-to-noise ratios resulting in acquisition failures at geographic boundaries of base stations, especially for legacy users.

Still further, conventionally, compensating for increased interference caused by the relaxing of scrambling code orthogonality (e.g., by increasing base station transmit power allocation) may reduce the overall capacity gains possible across wireless telecommunications networks and potentially consume undesirable amounts of system resources such as power.

Figure 3:
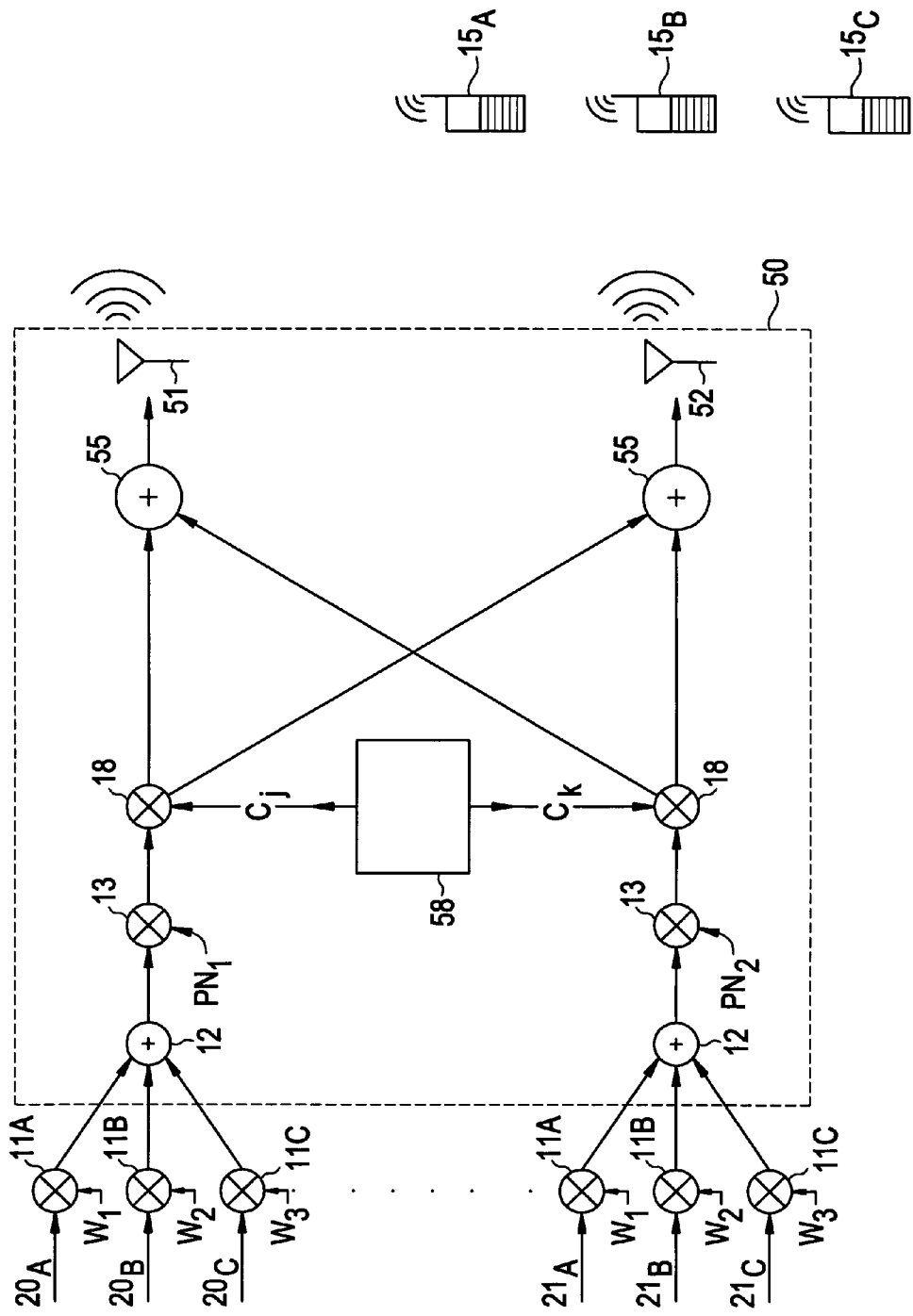
FIG. 3 is an illustration of a portion of a conventional multi-antenna wireless telecommunications network in which example embodiments may be implemented.
Figure 4:
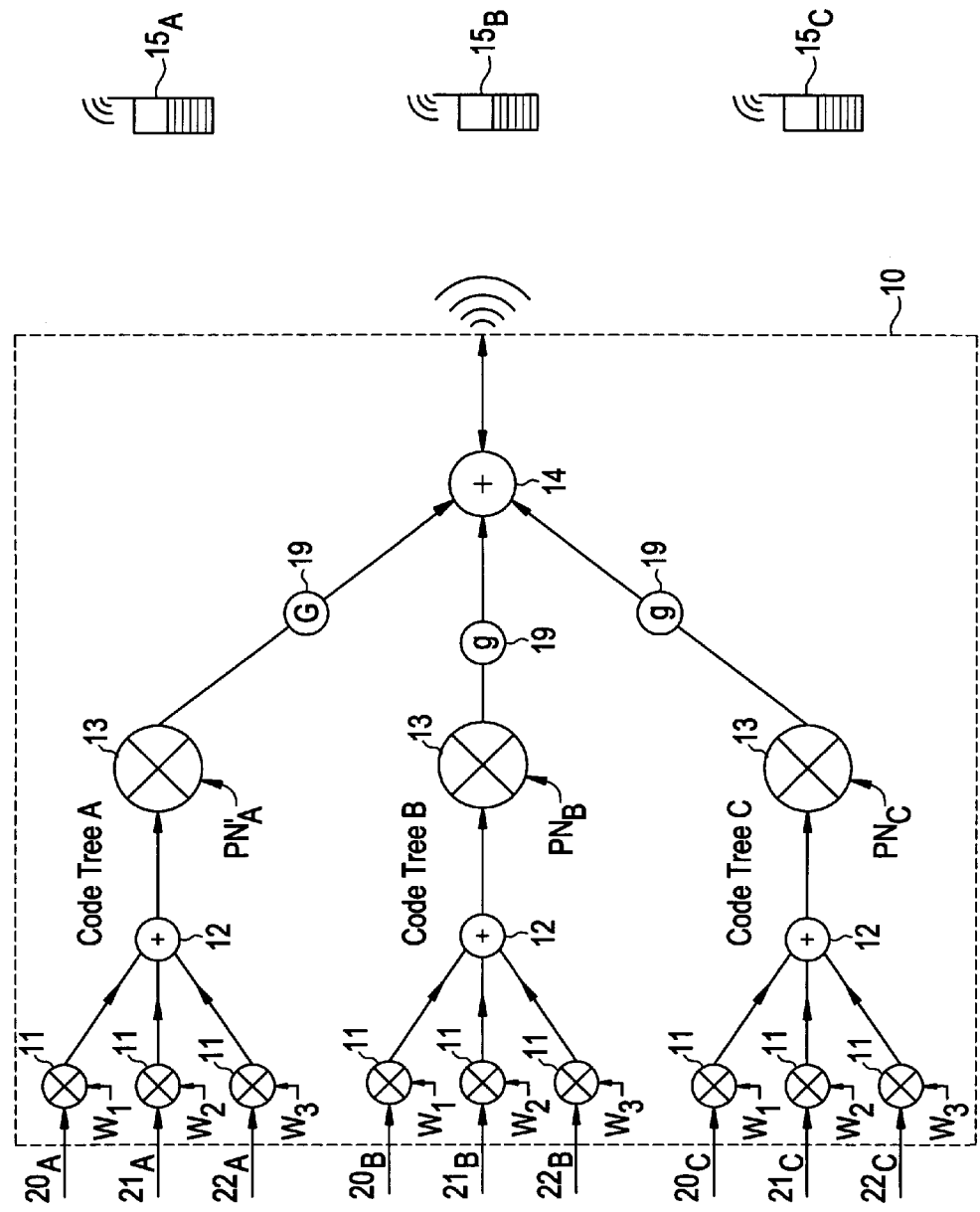
FIG. 4 is an illustration of a portion of a wireless telecommunications multi-antenna network according to an example embodiment.

Methods and apparatuses according to example embodiments allow telecommunications networks to support more users without consuming additional resources and/or resulting in reduced quality of service. Example methods described herein are useable with several different types of example telecommunications networks, including Code-Division Multiple Access (CDMA) networks configured as shown in FIGS. 1, 3, and/or 4. Although various elements of FIGS. 1, 3, and 4 are shown connected by similar arrows, it is understood that any and various types of communicative connection may be indicated by such arrows between connected elements (e.g., including a wireless connection, a fiber-optic cable connection, etc.) that permits the exchange of information there between. Further, mobile stations may take on a variety of forms, including a mobile phone, a wireless-equipped computer, a wireless-equipped personal data assistant, or any other device capable of receiving, processing, and sending data from/to a wireless network.

Example methods use secondary scrambling codes to create new, unique scrambling codes in addition to primary scrambling codes conventionally assigned to users. The secondary codes may be assigned to additional mobile stations and users thereof, who would otherwise be queued for or denied access to telecommunications networks using conventional methods. This permits additional users to access telecommunications networks.

A method for generating primary and secondary scrambling codes will be described below. As an example, Pseudo-Random Noise (PN) scrambling codes are used as primary scrambling codes in a CDMA-type wireless network. As is known, PN scrambling codes are quadrature sequences of any length, such as powers of 2. For example, a PN scrambling code of length $2^{15}$ is a sequence of 32768 PN digits or chips. Primary and secondary PN codes may be generated using polynomials such as shown below in Equations (1) and (2).

$$P_I(x) = x^{15} + x^{13} + x^9 + x^8 + x^7 + x^5 + 1 \quad (1)$$

$$P_Q(x) = x^{15} + x^{12} + x^{11} + x^{10} + x^6 + x^5 + x^4 + x^3 + 1 \quad (2)$$

Equation (1) is for in-phase (I) code and Equation (2) is for quadrature-phase (Q) code. Any known processing device, such as a maximum length linear feedback shift register circuit found in conventional networks, may generate codes i(n) and q(n) based on the above Equations (1) and (2) or the like using the following linear recursions given by Equations (3) and (4) shown below.

$$i(n) = i(n-15) \oplus i(n-10) \oplus i(n-8) \oplus i(n-7) \oplus i(n-6) \oplus i(n-2) \quad (3)$$

$$q(n) = q(n-15) \oplus q(n-12) \oplus q(n-11) \oplus q(n-10) \oplus q(n-9) \oplus q(n-5) \oplus q(n-4) \oplus q(n-3) \quad (4)$$

Equation (3) is based on the characteristic polynomial given by Equation (1). Equation (4) is based on the characteristic polynomial given by Equation (2). Both i(n) and q(n) are binary-values (such as "0" and "1") and the additions may be modulo-2. If a PN code length of $2^{15}$ is used, a '0' may be inserted in i(n) and q(n) after 14 consecutive '0' outputs to obtain the I and Q sequences.

Primary and secondary PN codes may be generated from a set of polynomials such as described above. The base station 10 shown in FIG. 1, for example, may use a time offset of the primary PN code to create and identify a secondary PN scrambling code, such that a secondary PN scrambling code is identified and used based on the offset alone. Different offsets may be used by different base stations, with offset re-use possible between geographically distant base stations. Because the use of offset to generate scrambling codes is generally known, a detailed discussion is omitted.

Other known mechanisms to produce secondary scrambling codes (e.g., including the use of multipliers and alternate code rearrangements) are useable in example methods depending on the desired ease of production and/or degree of non-orthogonality.

According to at least some example embodiments, each base station may use a unique offset or generation method to decrease the probability of non-orthogonality or redundancy between secondary scrambling codes of different base stations.

Figure 2:
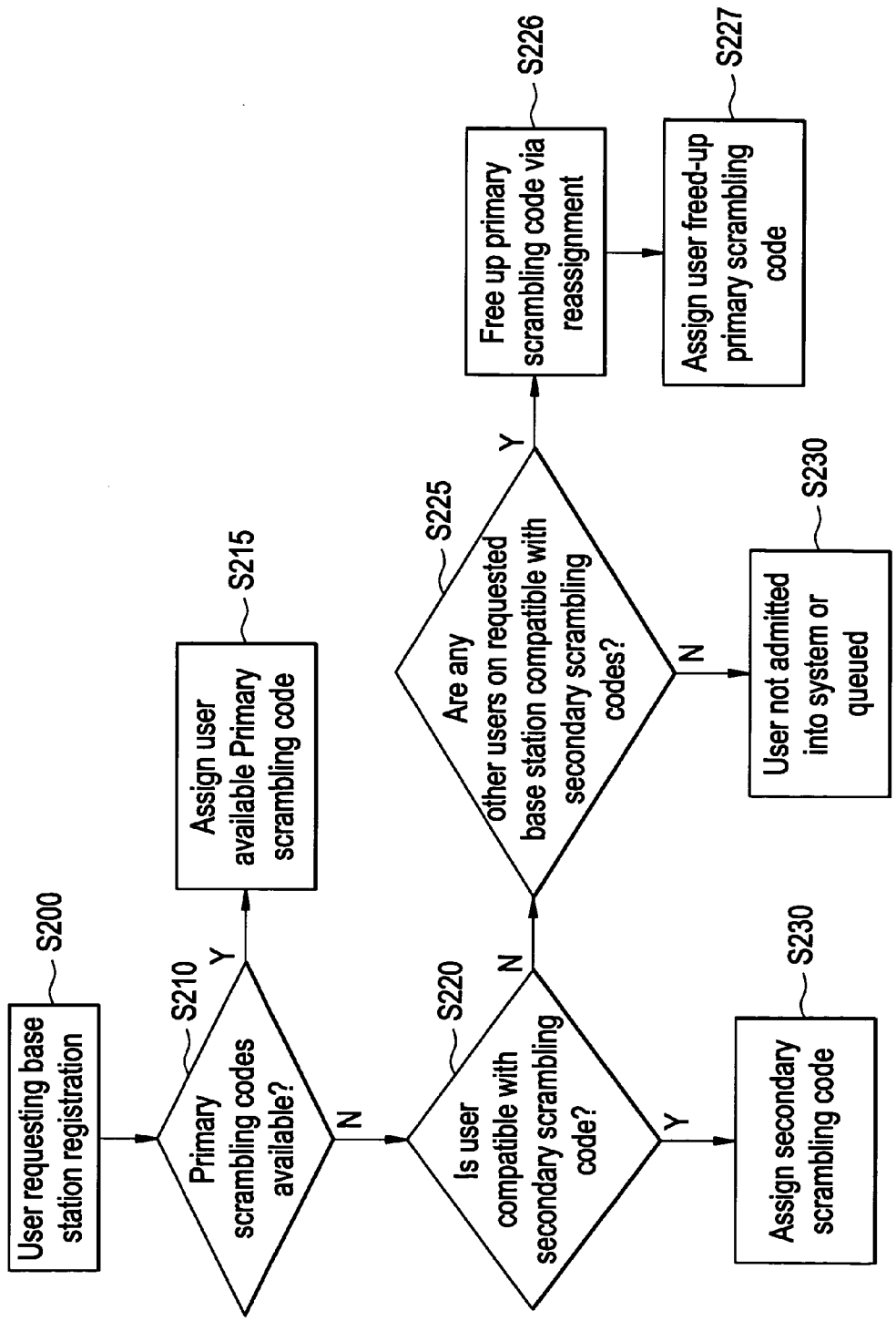
FIG. 2 is a flow chart illustrating a method for assigning scrambling codes according to an example embodiment.

FIG. 2 is a flow chart illustrating a method of assigning scrambling codes in telecommunications networks according to an example embodiment. The method shown in FIG. 2 will be described with regard to the telecommunications network shown in FIG. 1. However, it will be understood that the methods described herein are applicable to other networks, such as the telecommunications network shown in FIGS. 3 and/or 4.

Referring to FIG. 2, at step S200 mobile station 15 requests network access from base station 10. Example instances in which the mobile station 15 requests access include when a user powers on the mobile station 15 that registers with the base station 10 within a geographic area or when a mobile station 15 is passed off from one base station to another base station.

At step S210, the base station 10 checks the amount of primary scrambling code usage within the base station 10's cellular coverage area. If there are primary scrambling codes available at the base station 10, the mobile station 15 is registered and assigned an available primary scrambling code (s) at step S215.

If at step S210, the base station 10 determines that there are no primary scrambling codes available for the requesting mobile station 15, the base station 10 determines if the requesting mobile station 15 is capable of being assigned a secondary scrambling code. The mobile station 15 is capable of being assigned a secondary scrambling code if assignment of a potentially non-orthogonal secondary scrambling code will not have undesirable effects on connection quality (e.g., such as where the mobile station is associated and/or communicating with only a single base station).

If at step S220, the base station 10 determines that the mobile station 15 is eligible to be assigned a secondary scrambling code, the base station 10 generates and assigns a secondary scrambling code as discussed above for a communications/traffic channel of the mobile station 15 at step S230. Although traffic channels in simplex mode are compatible with secondary scrambling codes in this example method, it is understood that other compatibility criteria may be used to assess assignment capability at step S220 depending on network characteristics and quality of service targets.

If at step S220, the base station 10 determines that the requesting mobile station 15 is not capable of receiving a secondary scrambling code and meet desired performance criteria (e.g., if the requesting mobile station is in a soft handoff mode or otherwise communicating with more than one base station), the base station 10 determines whether other mobile stations associated with the base station 10 are capable of being assigned secondary scrambling codes at step S225. The other mobile stations associated with the base station 10 are capable of being assigned a secondary scrambling code if assignment of a potentially non-orthogonal secondary scrambling code will not have undesirable effects on their connection quality.

If at step S225, the base station 10 determines that another mobile station possesses a channel that may be reassigned a secondary scrambling code, the eligible mobile station is removed from the primary scrambling code and reassigned a generated secondary scrambling code at step S226 in accordance with the generation and assignment process discussed above. The base station 10 then assigns the freed and available primary scrambling code to the requesting mobile station 15 at step S227.

Again, although traffic channels in simplex mode are compatible with secondary scrambling codes in this example method, it is understood that other compatibility criteria, depending on network characteristics and quality of service, may be used to assess reassignment at step S225.

Returning to step S225, if the base station 10 determines that no other mobile stations are eligible for reassignment, the requesting user or mobile station 15 is denied access to the network at step S230. The denied user or mobile station 15 is then placed in a queue or otherwise disposed of in accordance with conventional methods.

Using secondary scrambling codes, the example method of FIG. 2 accommodates additional users in a telecommunications network that would otherwise be denied access in conventional methods. By assigning secondary scrambling codes to users and channels least affected by potential non-orthogonality present in secondary codes vis-à-vis primary codes, overall quality of service may be preserved or increased and network resource consumption per user may be minimized.

FIG. 4 illustrates a portion of a wireless telecommunications network in which example methods of assigning secondary scrambling codes may be implemented. Redundant numbering between elements of FIGS. 1, 3 and/or 4 indicates redundant elements, whose detailed description is omitted with respect to FIG. 4.

As shown in FIG. 4, when example methods (re)assign a secondary scrambling code to an eligible mobile station 15, channel or signal thereof, the base station 10 generates the secondary scrambling code $PN_A'$ as described above and the multiplier/encoder 13 encodes the combined signal output from adder 12 with the secondary code $PN_A'$. Multiplier 19 applies a unique semi-static power fraction to the secondary code encoded signal or channel.

The network shown in FIG. 4 may be any type of Code-Division Multiple Access (CDMA) telecommunications network. Further, although base station 10 of FIG. 4 is shown with a single antenna 14, it is understood that example methods are similarly useable with multiple antennas.

Multi-antenna networks may generate, assign and/or otherwise use secondary scrambling to improve performance. In addition, methods according to example embodiments may reduce interference caused by primary and secondary scrambling codes. A multi-antenna example embodiment will now be described with reference to FIG. 3.

FIG. 3 is an illustration of a portion of a multi-antenna network according to an example embodiment. As shown in FIG. 3, the base station 50 has some elements similar to those in base station 10 of FIG. 1 with like numbering indicating redundant elements whose detailed description is omitted. The base station 50 further includes a scheduler 58, the operation of which will be discussed in more detail below with regard to FIG. 5.

As shown in FIG. 3, instead of grouping, spreading, summing, and scrambling signals 20 and 21 by a code tree into a single antenna, similar types of signals are grouped together in code trees associated with multiple antennae. For example, Code Tree 1 receives related user content/traffic signals $20_A$, $20_B$ and $20_C$ for mobile stations 15A, 15B, and 15C, respectively. Code Tree 2 receives related overhead signals $21_A$, $21_B$, and/or $21_C$ (e.g., pilot signals) for respective mobile stations 15A, 15B, and 15C.

Within Code Tree 1, multiplier 11A applies spreading code $W_1$ to signal $20_A$, multiplier 11B applies spreading code $W_2$ to signal $20_B$, and multiplier 11C applies spreading code $W_3$ to signal $20_C$. The spread signals output from the multipliers 11A, 11B and 11C are summed by adder 12.

A scrambler/multiplier 13 scrambles the resultant signal output from the adder 12 with unique scrambling code $PN_1$. The scrambled resultant signal is output to multiplier 18 in Code Tree 1.

The multiplier 18 applies a feed-back weight $c_j$ to the scrambled resultant signal and outputs the weighted resultant signal to adder 55 in each of Code Tree 1 and Code Tree 2. The weight $c_j$ is a weight that maximizes signal-to-interference and noise ratio (SINR) at the j-th mobile station, and is output from the scheduler 58, which will be discussed in more detail later.

Within Code Tree 2, multiplier 11A applies spreading code $W_1$ to signal 21A, multiplier 11B applies spreading code $W_2$ to signal 21B, and multiplier 11C applies spreading code $W_3$ to signal 21C. The spread signals output from the multipliers 11A, 11B and 11C are summed by adder 12, and the resultant signal is scrambled with a unique scrambling code $PN_2$ by a scrambler/multiplier 13.

The scrambled resultant signal is output to multiplier 18 in Code Tree 2. The multiplier 18 in Code Tree 2 applies a feed-back weight $c_k$ to the scrambled resultant signal and outputs the weighted resultant signal to adder 55 in each of Code Tree 1 and Code Tree 2. The weight $c_k$ is a weight that maximizes signal-to-interference and noise ratio (SINR) at the k-th mobile location, and is also output from the scheduler 58. The scheduler 58 and the weight $c_k$ will be discussed in more detail later.

The adder 55 in each of Code Tree 1 and Code Tree 2 sums/combines the received weighted resultant signals and outputs the summed signals to respective antennas 51 and 52. The summed signals are then transmitted to mobile stations 15A, 15B, and 15C via the antennas 51 and 52.

In FIG. 3, instead of summing each Code Tree at a base station summer 14 as in FIG. 1, each summed and scrambled Code Tree is transmitted from multiple antennas. Thus, multiple mobile stations 15 receive signals from multiple antennas 51 and 52, each transmitting a unique code set having a unique scrambling code. Base station 50 transmits information regarding the number of and type of codes being carried on multiple antennas 51 and 52 such that the mobile stations 15A, 15B, and 15C properly recognize and decode each Code Tree.

Still referring to FIG. 3, in accordance with methods discussed herein, scrambling codes and antenna usage is assigned and/or managed such that the effects of any non-orthogonality present between primary and secondary scrambling codes are reduced. An example manner in which this is performed will be discussed in more detail below.

The base station 50 transmits a broadcast message on any channel (e.g., overhead channels) identifying the use of antennas 51 and 52, and the scrambling codes $PN_1$ and $PN_2$ associated with each antenna. If, for example, scrambling code $PN_2$ is a secondary scrambling code, the base station 50 transmits an identifier for antenna 52 and an offset corresponding to scrambling code $PN_2$ to mobile stations 15 receiving signals from both antennas 51 and 52 to identify, decode, and use such signals.

As discussed above, secondary scrambling codes may have some non-orthogonality with respect to primary scrambling codes. Example methods reduce this interference and/or other loss of signal quality in situations where mobile stations receive signals from multiple antennas.

As discussed in more detail below, example methods may use a specialized assignment algorithm to determine the use of primary and secondary scrambling codes between antennas.

Generally, if $x_k$ denotes the composite transmit signal via the k-th scrambling code (e.g., the signal being transmitted from antenna 51 scrambled with primary scrambling code $PN_1$) and $x_j$ denotes the composite transmit signal via the j-th scrambling code (e.g., the signal being transmitted from antenna 52 scrambled with secondary scrambling code $PN_2$), the composite received signal at the k-th mobile station (e.g., mobile station 15) in the open-loop scheme shown in FIG. 3 is given by Equation (5).

$$r_k = h_{kk}x_k + h_{jk}x_j + n \quad (5)$$

In Equation (5), n represents white Gaussian noise, $h_{kk}$ corresponds to the channel from the k-th transmit antenna to the k-th mobile, and $h_{jk}$ corresponds to the channel from the k-th transmit antenna to the j-th mobile. Compared to the received signal in a single-antenna scheme, which may be expressed by Equation (6) shown below:

$$r_k = h_{kk}x_k + h_{kk}x_j + n, \quad (6)$$

the multi-antenna case contains additional interference from the secondary scrambling code corresponding to the channel variation toward the k-th user.

In a closed loop scheme, the mobile terminal 15 transmits feed-back information to the base station 50 indicating a weighting factor that increases or maximizes its received signal-to-interference and noise (SINR) in a multiple antenna system. As noted above, $c_k$ is a weight that maximizes SINR at the k-th mobile station, the composite received signal at the k-th mobile station may be expressed by Equation (7) shown below.

$$r_k = c_k^H h_k x_k + c_k^H h_j x_j + n \quad (7)$$

In Equation (7), $h_k$ is a channel from base station 50 to the corresponding k-th mobile station (e.g., signal 20 or 21 for mobile station 15), and n is a Gaussian random variable that sums noise and other cell interference.

Example methods reduce or eliminate interference caused by secondary scrambling codes from secondary antennas by setting $c_k^H h_j = 0$ in Equation (7) above. The base station 50 in FIG. 3 may achieve this by selecting mobile stations k and j in a manner that reduces, minimizes and/or eliminates the contribution of the j-th mobile station's signal $x_j$ to interference on $r_k$.

Figure 5:
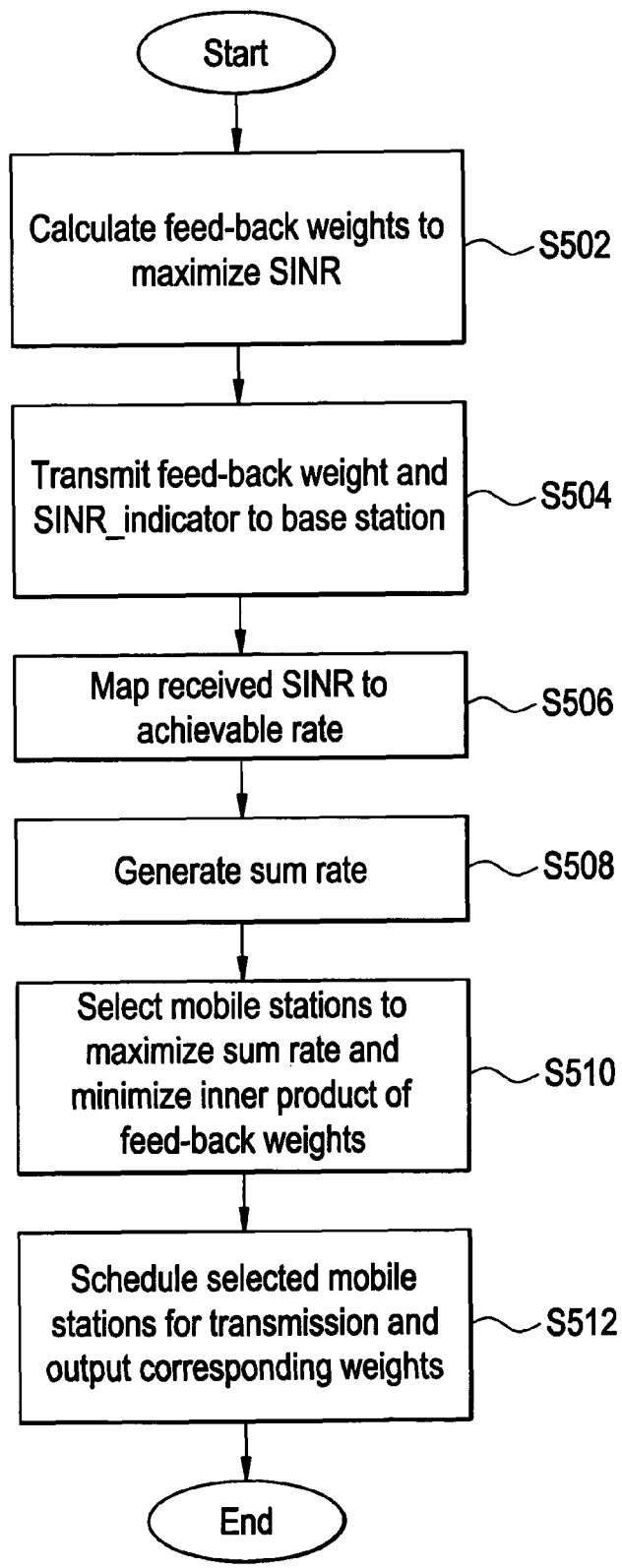
FIG. 5 is a flow chart illustrating a method for reducing interference according to an example embodiment.

FIG. 5 is a flow chart illustrating a method for reducing interference caused by secondary scrambling codes from secondary antennas according to an example embodiment. As discussed in more detail below, steps S502 and S504 of the method shown in FIG. 5 are performed at the mobile stations 15, whereas steps S506-S512 are performed at the base station 50, and more particularly, the scheduler 58. As such, the method shown in FIG. 5 will be discussed in conjunction with the telecommunications network shown in FIG. 3.

In FIG. 5, the scheduler 58 reduces interference between mobile stations assigned primary and secondary scrambling codes by selecting indices of mobile stations to be scheduled based on a correlation between fed-back code weights $c_k$ and $c_j$, where $c_k$ is a feed-back weight for a k-th one of the mobile stations 15 and $c_j$ is a feed-back weight for a j-th one of the mobile stations 15.

Referring to FIG. 5, at step S502 each mobile station 15 determines a feedback weight (e.g., $c_k$) that, if applied by the base station 10, maximizes the signal-to-interference and noise ratio (SINR) at that mobile station 15. In one example, the k-th mobile station calculates the SINR according to the formula shown below in Equation (8).

$$SINR_k = \sum_{l=1}^{L} \frac{p_0 |h_l^H c_k|^2}{N_0 + h_l^H(R - p_0 c_k c_k^H)h_l + \sum_{j \neq l} h_l^H R h_l + I_{oc}}$$

In Equation (8), L is the number of paths in the channel, $c_k$ is the feed-back weight for the k-th mobile station, $p_0$ represents the power of the transmitted downlink pilot signal, and $h_l^H$ is the hermitian conjugate of the channel for the l-th path from the base station 50 towards the k-th mobile station. As is known, the "H" notation denotes hermitian conjugate.

The denominator in Equation (8) is formed by the summation of the white Gaussian noise power $N_0$ and interference $I_{oc}$. The interference $I_{oc}$ may include: inter-path interference, interference coming from the presence of transmissions in the secondary scrambling code as well as interference coming from other cells. In Equation (8), the denominator is mathematically expressed by $N_0 + h_l^H(R - p_0 c_k c_k^H)h_l + \sum_{j \neq l} h_l^H R h_l + I_{oc}$, where R is the transmit spatial covariance matrix of all transmitted signals defined by Equation (9) shown below.

$$R = \sum_a c_a c_a^H \quad (9)$$

In Equation (9), indices 'a' are the indices of all mobile stations transmitted by the serving sector irrespective of their allocation to a specific code tree.

Returning to FIG. 5, at step S504 each mobile station 15 sends a Channel Quality Indicator (CQI) and feedback weight (e.g., $c_k$) to the base station 10 via a signaling channel. The CQI is also referred to herein as a SINR and/or SINR indicator because the scheduler 58 considers received CQIs from the mobile stations 15 as the signal-to-interference and noise ratio (SINR) quantities perceived by the mobile stations 15.

Once having received the SINR indicator (CQI) from the mobile stations 15, at step S506 the scheduler 58 maps the received SINR (CQI) of each mobile station 15 to an achievable rate using a look-up table or according to the known equation R=log(1+SINR).

At step S508, the scheduler 58 generates a sum rate metric for each set of candidate mobile stations (hereinafter candidate set) among the mobile stations in the network. Each candidate set includes at least two mobile stations 15 among the plurality of mobile stations to which resources may be allocated simultaneously, concurrently or otherwise. In the example network of FIG. 3, each candidate set includes a pair of mobile stations 15. The sum rate metric for each candidate set is generated based on the achievable rates associated with each candidate mobile station in the candidate set. In one example, the sum rate metric is a sum rate calculated by summing the achievable rates for each mobile station in a candidate set of mobile stations.

Still referring to FIG. 5, at step S510 the scheduler 58 selects a candidate set including mobile stations based on a correlation between the feed-back weights associated with each mobile station in the candidate set.

In one example, the scheduler 58 selects the candidate set including mobile stations having weights that minimize or zero-out the inner product $c_j^T c_k$. The notation 'T' is a known partial inner product notation and denotes the transpose operator. The scheduler 58 may identify the minimum or zeroed-out inner product $c_j^T c_k$ by examining the sum rate metrics associate with each candidate set. The candidate set associated with the maximum sum rate compared to other candidate sets is chosen as the candidate set having the minimum or zeroed-out inner product $c_j^T c_k$.

At step S512, the scheduler 58 allocates wireless resources to or schedules the selected mobile stations 15 for transmission, and outputs the selected weights $c_j$ and $c_k$ to multipliers 18 on respective Code Tree 1 and Code Tree 2.

As shown in FIG. 3, the multiplier 18 applies the weights $c_k$ and $c_j$ such that the selected j-th and k-th mobile station have a unique weighting for each channel/signal received from antennas 51 and 52.

According to at least some example embodiments, for a finite number of transmit antennas N, example methods suppress a portion of the total secondary scrambling code interference that is directly proportional to the number of transmit antenna elements.

Methods according to example embodiments may also be implemented in conjunction with a single-antenna network, such as the conventional network shown in FIG. 1. In this case, example methods may selectively generate and assign secondary scrambling codes to additional users requesting network access. Example methods may assign secondary scrambling codes in a manner that reduces the effects of non-orthogonality present between primary and secondary scrambling codes. For example, secondary scrambling codes may not be assigned to overhead channels in example methods, as overhead channels may be more sensitive to non-orthogonality. Alternatively, for example, secondary scrambling codes may not be assigned to users in soft-handoff and/or other non-simplex (associated with more than one base station) modes. Similarly, example methods may prioritize the assignment of secondary scrambling codes to content channels in simplex mode. The preceding examples of secondary scrambling code assignment are not inclusive, other assignments and bases for assignment may be used in example methods.

Secondary scrambling codes may be assigned or otherwise identified to mobile stations similar to the assignment and identification of primary scrambling codes. For example, a network assigning a secondary scrambling code in an example method may notify a mobile station of the assignment through an overhead channel with control-type signals. For example, in a PN situation on a CDMA network, the secondary PN scrambling code may be assigned via a known Channel Assignment Message and/or Extended Channel Assignment Message specially adapted to carry secondary PN code identification, such as an offset discussed above. Alternatively, a Universal Handoff Direction Message may carry the secondary PN code if the user is being handed off between geographic zones. Other types of messages and channels may be used to communicate the secondary scrambling code to the assigned mobile station, as will be appreciated by those skilled in the art.

Codes scrambled by secondary scrambling codes may receive greater average power multiplication by multipliers 19 present in conventional networks as shown in FIG. 1. By increasing the power fraction to secondary scrambled signals, performance degradation due to non-orthogonality caused by the secondary scrambling codes may be reduced. Alternatively, other power fraction assignment or no signal multiplication at all may be useable with example methods based on network characteristics.

Example embodiments and methods thus being described, it will be appreciated by one skilled in the art that example embodiments may be varied through routine experimentation and without further inventive activity. For example, any variety of suitable scrambling code types may be used in several different types of communications networks that use unique, characteristic scrambling codes for different users and types of communications. Variations are not to be regarded as departure from the spirit and scope of the exemplary embodiments, and all such modifications as would be obvious to one skilled in the art are intended to be included within the scope of the following claims.

What is claimed is:

1. A method of reducing interference in a multi-antenna wireless telecommunications network using primary and secondary scrambling codes, the method comprising:
   selecting, by a base station, a candidate set of mobile stations among a plurality of candidate sets of mobile stations based on a code weight correlation associated with each candidate set; wherein
      each candidate set includes at least a first mobile station assigned a primary scrambling code and at least a second mobile station assigned a secondary scrambling code, and
      the code weight correlation associated with each candidate set is a correlation between code weights associated with mobile stations in the candidate set; and
   allocating, by the base station, wireless communication resources to the mobile stations in the selected candidate set.

2. The method of claim 1, wherein the selecting step selects the candidate set associated with a minimum code weight correlation among the code weight correlations.

3. The method of claim 1, wherein the code weight correlation for each candidate set is an inner product of the code weights associated with the mobile stations in the candidate set.

4. The method of claim 1, further comprising:
   generating, by the base station, a sum rate metric for each candidate set based on a signal-to-interference and noise ratio (SINR) indicator received from the mobile stations within the candidate set, the sum rate metric being indicative of the code weight correlation for the candidate set; wherein
   the selecting step selects the candidate set having a minimum code weight correlation based on the generated sum rate metrics.

5. The method of claim 4, wherein the maximum sum rate metric corresponds to the minimum code weight correlation.

6. The method of claim 4, further comprising:
   determining, by the base station, an achievable rate based on the signal-to-interference and noise ratio (SINR) indicator for each of the plurality of mobile stations; and wherein
   for each candidate set, the generating step generates the sum rate metric based on the determined achievable rate for each mobile station in the candidate set.

7. The method of claim 6, wherein, for each of the plurality of mobile stations, the determining step determines the achievable rate by mapping the received SINR indicator to an achievable rate using a look-up table.

8. The method of claim 4, wherein the SINR indicator is a channel quality indicator (CQI).

9. The method of claim 1, wherein, for each candidate mobile station, the code weight is calculated to minimize SINR at the mobile station.

10. The method of claim 1, wherein the allocating step comprises:
    scheduling the mobile stations in the selected candidate set for concurrent or simultaneous transmission.

11. The method of claim 1, further comprising:
    first determining if a primary scrambling code is available for the first mobile station requesting network access;

assigning the first mobile station a primary scrambling code if the determining step determines that a primary scrambling code is available;
generating the secondary scrambling code if the determining step determines that a primary scrambling code is not available; and
assigning the first mobile station the generated secondary scrambling code if the determining step determines that a primary scrambling code is not available.

12. The method of claim 11, further comprising:
second determining if the first mobile station is compatible with the secondary scrambling code, if the primary scrambling code is not available;
generating the secondary scrambling code if the second determining step determines that the first mobile station is compatible with the secondary scrambling code; and
assigning the first mobile station the generated secondary scrambling code if the second determining step determines that the first mobile station is compatible with the secondary scrambling code.

13. The method of claim 12, wherein generating the secondary scrambling code includes applying an offset to the primary scrambling code such that some non-orthogonality exists between the primary scrambling code and the secondary scrambling code.

* * * * *